(12) United States Patent
Kim et al.

(10) Patent No.: US 6,975,799 B2
(45) Date of Patent: Dec. 13, 2005

(54) ALIGNMENT APPARATUS AND METHOD FOR OPTICAL FIBER BLOCKS

(75) Inventors: Sang-Ho Kim, Kumi-shi (KR);
Yeong-Seop Lee, Kumi-shi (KR);
Hyeon-Cheol Kim, Kumi-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 139 days.

(21) Appl. No.: 10/650,574

(22) Filed: Aug. 28, 2003

(65) Prior Publication Data

US 2004/0052470 A1   Mar. 18, 2004

(30) Foreign Application Priority Data

Sep. 18, 2002 (KR) ...................... 10-2002-0056975

(51) Int. Cl.[7] ........................... G02B 6/26; G02B 6/36; G02B 6/255
(52) U.S. Cl. ............................. 385/52; 385/88; 385/90; 385/95; 385/97
(58) Field of Search ............................. 385/52, 88, 90, 385/97

(56) References Cited

U.S. PATENT DOCUMENTS

| | | | | |
|---|---|---|---|---|
| 6,571,041 B2 * | 5/2003 | Bourcier et al. | ............... | 385/52 |
| 6,654,524 B2 * | 11/2003 | Shekel et al. | ................. | 385/52 |
| 6,668,128 B2 * | 12/2003 | Hattori et al. | .............. | 385/136 |
| 6,690,864 B1 * | 2/2004 | Dee et al. | ..................... | 385/52 |

* cited by examiner

*Primary Examiner*—John D. Lee
*Assistant Examiner*—James D. Stein
(74) *Attorney, Agent, or Firm*—Cha & Reiter, L.L.C.

(57) ABSTRACT

This invention relates to an alignment apparatus for aligning a planar optical wave-guide element and an optical fiber block wherein alignment can be completed with more precision and less expense than conventional methods. The alignment apparatus comprising a lower plate; a sliding table mounted on the lower plate capable of horizontal displacement on the lower plate; an upper plate mounted to the sliding table; and, a jig disposed on the upper plate and fixed to rotational means and capable of rotation about the upper plate for holding the optical fiber block.

12 Claims, 8 Drawing Sheets

ALIGNMENT APPARATUS AND METHOD FOR OPTICAL FIBER BLOCKS

CLAIM OF PRIORITY

This application claims priority to an application entitled "ALIGNMENT APPARATUS FOR OPTICAL FIBER BLOCKS", filed in the Korean Intellectual Property Office on Sep. 18, 2002 and assigned Serial No. 2002-56975, the contents of which are hereby incorporated by reference.

BACKGROUND OF THE INVENTION

1. Field of the Invention

The present invention relates to an optical communication device. More particularly, it relates to an alignment apparatus for connecting an optical fiber block to a planar optical wave-guide element.

2. Description of the Related Art

In general, a planar optical wave-guide element has been used to divide many different wavelengths of optical signals advancing through a single optical path into respective single wavelengths of optical signals advancing through a plurality of optical paths. The planar optical wave-guide element includes at least one input terminal end and a plurality of output terminal ends so as to branch optical signals. There is included a core forming an optical wave-guide path between the input and output terminal ends to branch optical signals. The core is enclosed by a cladding material. Each of the input and output terminal ends is connected by an optical fiber, thus causing optical signals to be input or output.

Typically, an optical fiber block is used to stably connect an optical fiber to the input or output terminal end of the planar optical wave-guide element. The optical block is adapted to arrange a single-cored optical fiber or a multiple-cored optical fiber into a V-shaped groove and then bond the optical fiber with an adhesive such as epoxy or the like, wherein the single-cored optical fiber has a single optical fiber strand, without an outer sheath on its terminal end, arranged into the V-shaped groove, but the multiple-cored optical fiber does generally take a ribbon form and has a plurality of optical fiber strands, without an outer sheath on its terminal end, arranged into the V-shaped groove.

The optical fibers arranged on the optical fiber block as well as on the planar optical wave-guide element as mentioned above must be connected to each other with considerable precision.

FIG. 1 is a perspective view of an alignment apparatus 100 for optical fiber blocks according to a conventional embodiment. FIG. 2 is a side view for describing the operation of the alignment apparatus 100 for optical fiber blocks shown in FIG. 1. As shown in FIGS. 1 and 2, an alignment apparatus 100 for optical fiber blocks in accordance with the conventional embodiment is mounted on an alignment driving actuator 190 and comprises a base plate 111, a lower plate 113, a upper plate 115, a sliding table 117, a jig 119 for locking an optical fiber block, a locking axle 127, a locking driver 125, and a displacement sensor 123.

The base plate 111 includes a first plate 111a for mounting the alignment apparatus 100 for optical fiber blocks to the alignment driving actuator 190, and a second plate 111b extending in a direction perpendicular to the first plate 111a. The lower plate 113 is mounted on the second plate 111b.

The lower plate 113 helps to guide the sliding table 117 to move horizontally in a forward or backward direction z, taking a folded form vertically extending from the opposite ends thereof so as not only to mount the locking driver 125 but also to restrict a movable range of the sliding table 117. That is to say, the lower plate 113 is designed so that the movable range of the sliding table 117 is restricted by it and that both the locking driver 125 and the displacement sensor 123 are mounted to it.

The sliding table 117 is intended to finely align an optical fiber block 101 which is locked to the jig 119. When the optical fiber block 101 is locked to the jig 119, the optical fiber block 101 is subjected to a resilient force from a certain resilient means 121 in a direction such that the optical fiber block 101 comes into a close contact to a corresponding counterpart component 102 such as the planar optical wave-guide element. The sliding table 117 is horizontally movable on the lower plate 113 and at the same time is subjected to restriction to the movable range thereof by the configuration of the lower plate 113.

The upper plate 115 is firmly mounted on the sliding table 117 so that it is possible for the upper plate to move together with the sliding table 117. The upper plate 115 is also provided with the jig 119.

The jig 119 for locking the optical fiber block 101 includes a bracket 119a for positioning the optical fiber block 101 and a holder 119b for locking the optical fiber block 101 positioned by the bracket 119a. The optical fiber block 101 positioned by the bracket 119b is locked to protrude forward farther than both the lower plate 113 and the upper plate 115.

The locking axle 127, the locking driver 125 and the displacement sensor 123 are installed on the folded part 113a vertically extending from a rear end of the lower plate 113. Therefore, the sliding table 117 is locked when displacement of the sliding table 117 aligns the optical fiber block 101 in the optimal position. That is to say, the optical fiber block 101 comes into close contact with the counterpart component, such as a planar optical wave-guide element or the like. An end surface of the optical fiber block 101 is aligned parallel to an end surface of the counterpart component. At this position, the sliding table 117 is located at a forefront while the optical fiber block 101 is aligned, whereby the position is sensed by the displacement sensor 123. The locking driver 125 moves the locking axle 127 forward, and thereby locks the upper plate 115.

The alignment apparatus 100 for optical fiber blocks as mentioned above is mounted on the alignment driving actuator 190.

The alignment driving actuator 190 provides the optical fiber block 101 with three dimensional linear and rotational alignments in relation with a x-axis, a y-axis and a z-axis, respectively, wherein the linear alignments are performed along to the respective x-, y- and z-axes, i.e. in a left or right direction x, in an upward or downward direction y, and in a forward or backward direction z; whereas the rotational alignments are performed about the respective x-, y- and z-axes, i.e. in a x-axial rotational direction θx, in a y-axial rotational direction θy, and in a z-axial rotational direction θz.

Referring to FIG. 2, the linear alignments of all the x-, y- and z-axes and the rotational alignment for the z-axis are performed by a lower driving actuator 191. The rotational alignments of the x- and y-axes are performed by first and second upper driving actuators 197 and 199. The lower driving actuator 191 first performs an approximate alignment first and then the upper driving actuators 197 and 199 perform a fine alignment.

Also, for alignments of the three axial linear directions x, y and z, respectively, and three axial rotational directions θx, θy and θz, driving motors are required corresponding to each of the directions. Particularly, for respective fine alignments of the x and y axial rotational directions θx and θy, respectively, driving motors with high precision are required.

Despite these high precision driving motors, the conventional alignment apparatus is flawed in that the motors perform alignment of the x- and y-axial rotational directions, θx and θy respectively, individually, resulting is poor alignment with respect to one another. Moreover, the bracket on which the optical fiber block is positioned is manufactured corresponding to the size of the optical fiber block. Consequently, the bracket should be replaced in order to align another optical fiber block on which another cored optical fiber is arranged.

SUMMARY OF THE INVENTION

Accordingly, there is a need to provide an alignment apparatus that can perform its intended purpose efficiently with more precision and less expense.

According to one aspect of the invention, a jig that freely rotates about the axis running through the center of the fiber optic block is provided and serves as the alignment means about the y rotational axis, and further provides for simultaneous alignment of the x and y rotational axes providing a higher magnitude of precision. The jig eliminates the need for a separate driving motor for the alignment of the y rotational axis reducing the manufacturing cost of the apparatus.

According to another aspect of the invention, a jig is provided with a supporting part that traverses on the holding part, thereby permitting the use of fiber optic blocks of different sizes on the same jig and decreasing manufacturing costs as only one jig is needed to perform the alignment for any size of fiber optic block.

Accordingly, there is provided an alignment apparatus for optical fiber blocks for aligning a planar optical wave-guide element and an optical fiber block, comprising: a lower plate; a sliding table mounted on the lower plate capable of horizontal displacement on the lower plate; an upper plate mounted to the sliding table; and, a jig disposed on the upper plate and fixed to rotational means capable of rotation about the upper plate for holding the optical fiber block.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. For the purposes of clarity and simplicity, a detailed description of known functions and configurations incorporated herein ill be omitted as they would obscure the invention in unnecessary detail.

Figure 3:
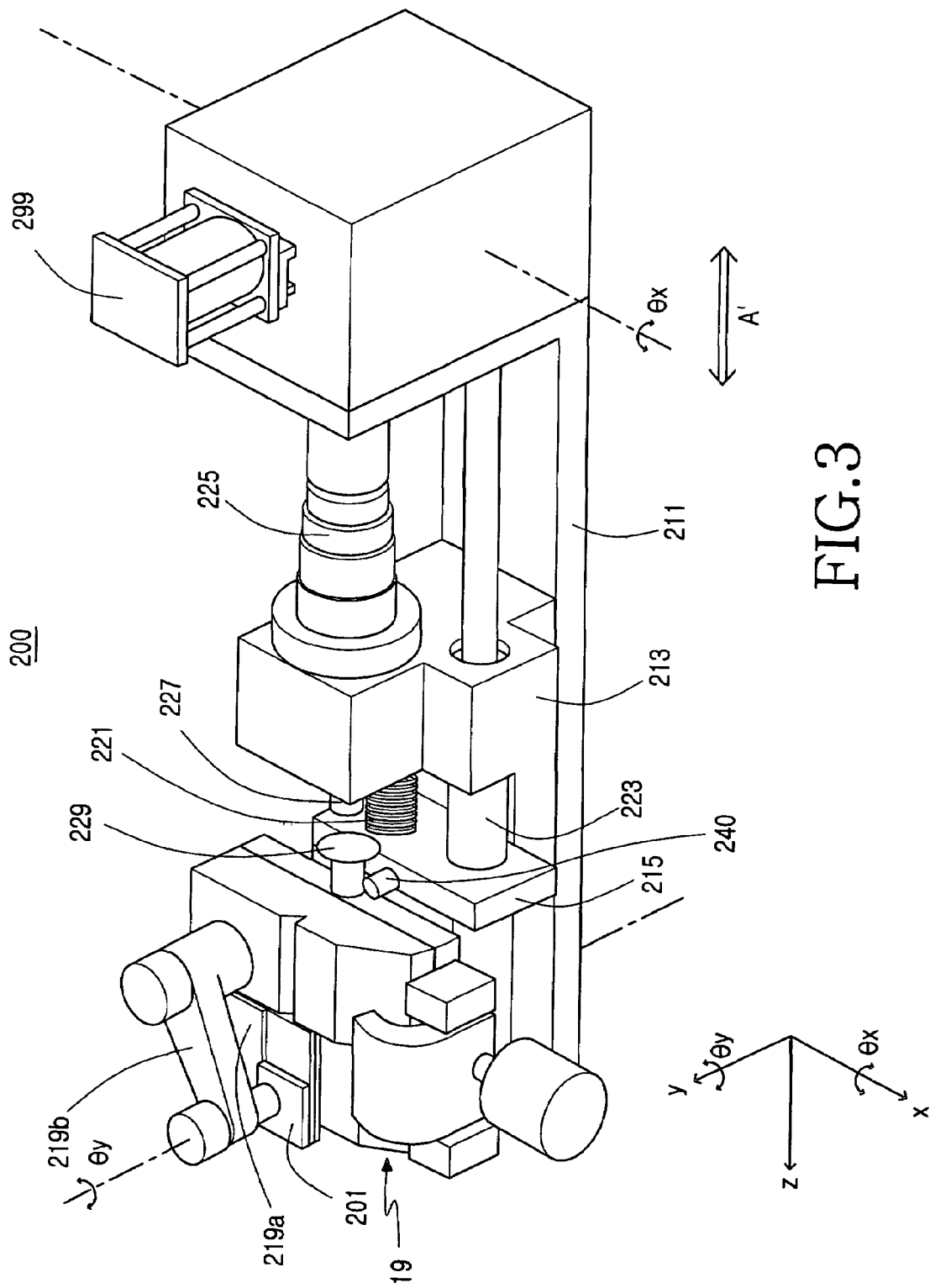
FIG. 3 is a perspective view of an alignment apparatus for optical fiber blocks according to a preferred embodiment of the present invention.
Figure 4:
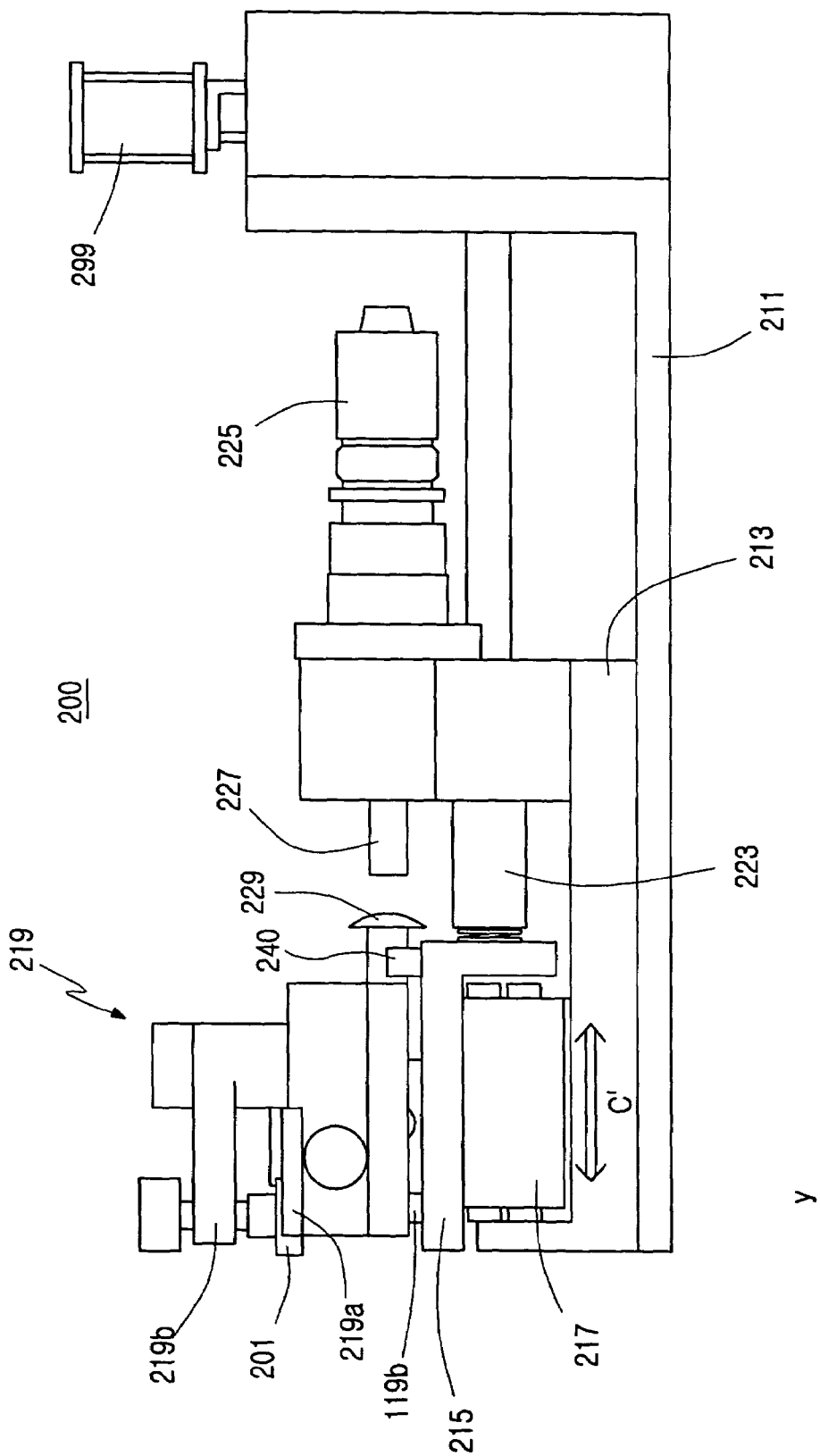
FIG. 4 is a side view of the alignment apparatus for optical fiber blocks shown in FIG. 3.
Figure 8:
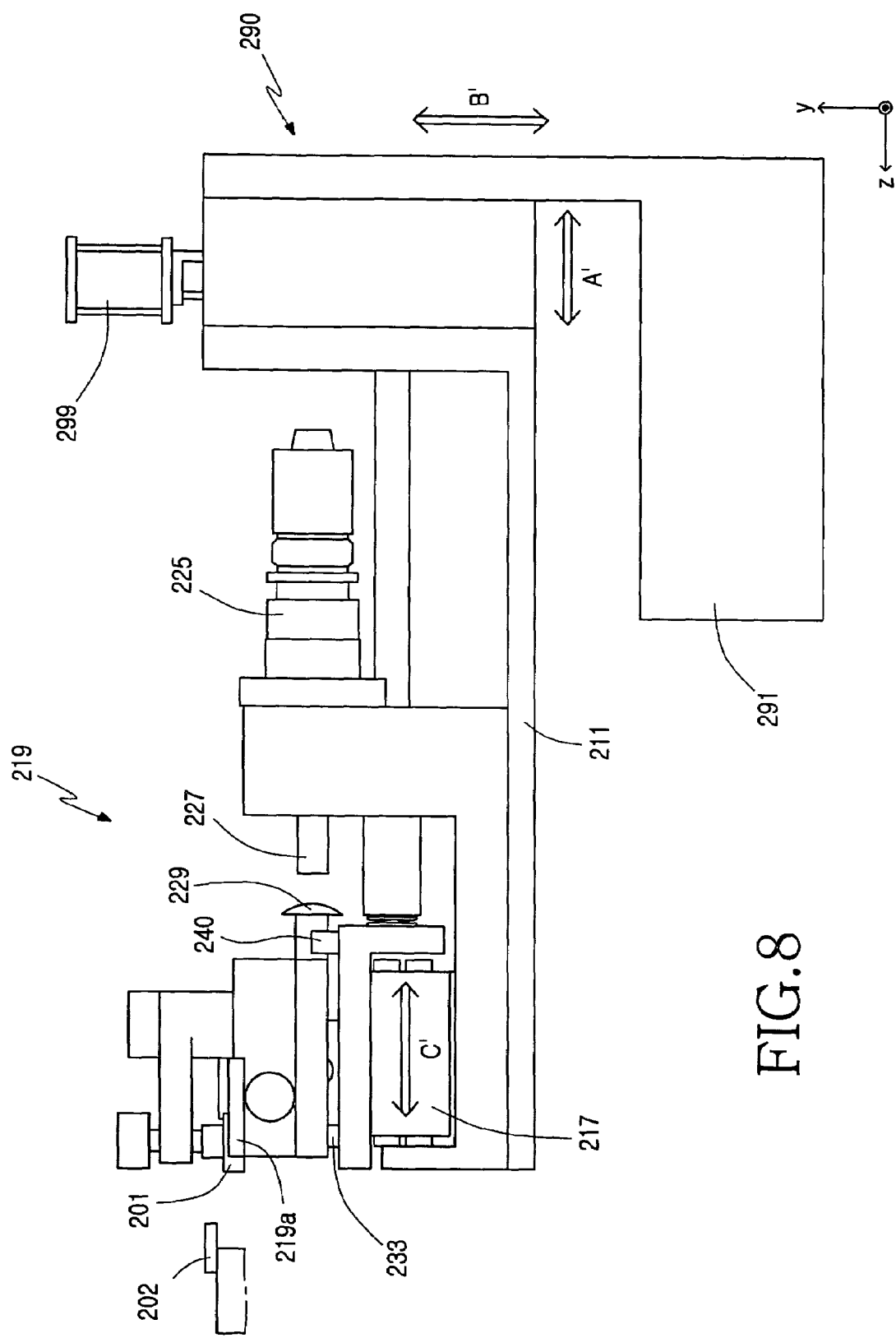
FIG. 8 is a side view for describing operation of the alignment apparatus for optical fiber blocks shown in FIG. 3.

FIG. 3 is a perspective view of an alignment apparatus 200 for optical fiber blocks according to a preferred embodiment of the present invention. FIG. 4 is a side view of an alignment apparatus 200 for optical fiber blocks as shown in FIG. 3. As shown in FIGS. 3 and 4, an alignment apparatus 200 for optical fiber blocks according to a preferred embodiment of the present invention comprises a base plate 211, a lower plate 213, a sliding table 217, an upper plate 215, a jig 219 for locking an optical fiber block, a locking axle 227, a locking driver 225 and a displacement sensor 223. The alignment apparatus 200 is mounted on an alignment driving actuator 290, as shown in FIG. 8.

The base plate 211 extend vertically upward at one end where it is mounted to the alignment driving actuator 290 of the alignment apparatus 200. The lower plate 213 is mounted to the base plate 211.

The lower plate 213 acts as a guide for the sliding table 217 to move horizontally thereon in a forward and backward direction z. Both ends of lower plate 213 protrude perpendicularly upward in direction y so that one end serves to mount the locking driver 225, locking axle 227, and the displacement sensor 223 therethrough. Another consequence of the lower plate 213 having such a configuration is to restrict the displacement of the sliding table 217 thereon. That is, the vertical ends act as stops or side walls for the sliding table 217. The upper plate 215 is rigidly mounted on the sliding table 217 so that they are both displaced horizontally simultaneously with respect to the lower plate 213. The upper plate 215 is constructed having an L-shape. It is fixed to the sliding table 217 so that one portion of the upper plate 215 lays flat on the top surface of the sliding table 217 and the other end is perpendicular to that portion and extends downward in a y direction so as to come between the sliding table 217 on one side and the locking axle 227, the locking driver 225, and displacement sensor 223 on the other side. The upper plate 215 is provided with the jig 219 attached thereon.

A resilient means 221 for providing a resilient force upon the sliding table 217 is fitted between the side wall of the lower plate 213 having the locking driver 225, locking axle 227, and displacement sensor 223 mounted therethrough, and the portion of the upper plate 215 extending downward in a y direction. The resilient force acts on the upper plate in the z direction displacing the upper plate, the sliding table 217, and the jig 219 in the same direction. Consequently, the optical fiber block 201 which is locked in the jig 219 comes into close contact with a corresponding counterpart component, for example the planar optical wave-guide element.

Figure 5:
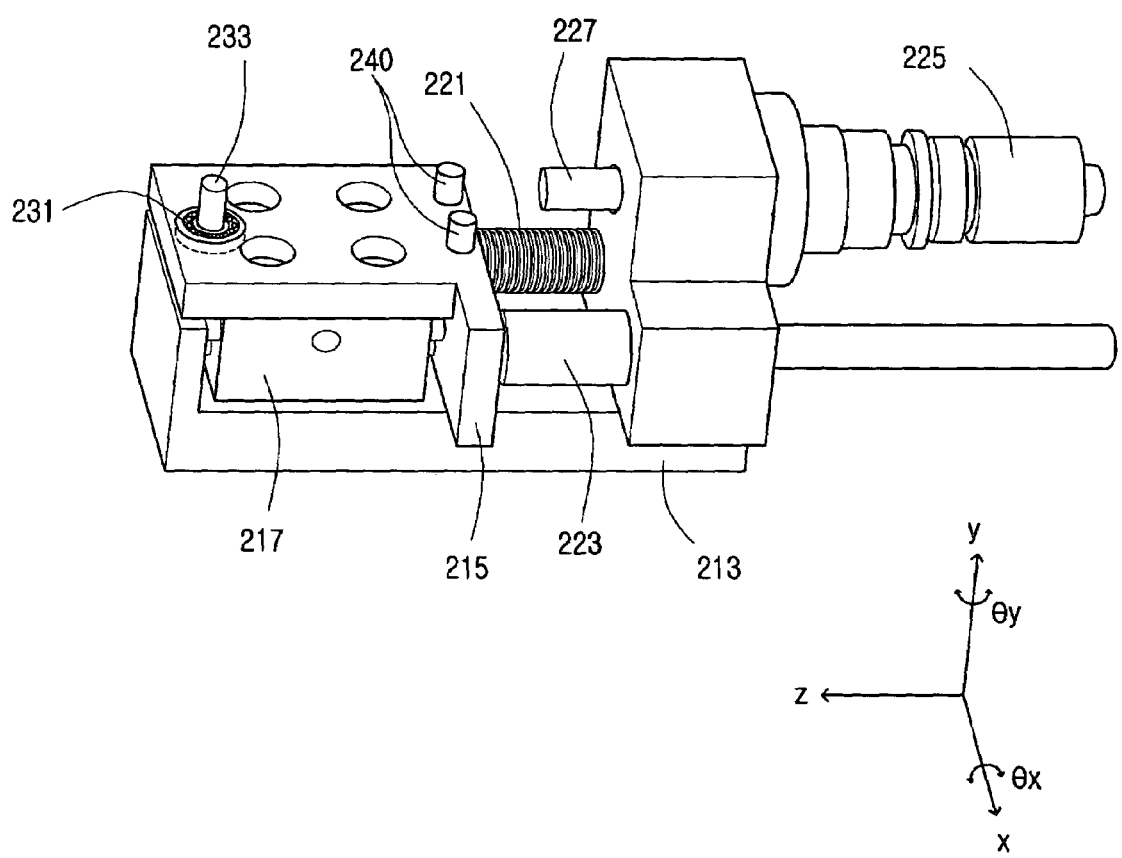
FIG. 5 is a perspective view showing a state in that a jig is eliminated from the alignment apparatus for optical fiber blocks shown in FIG. 3.
Figure 6:
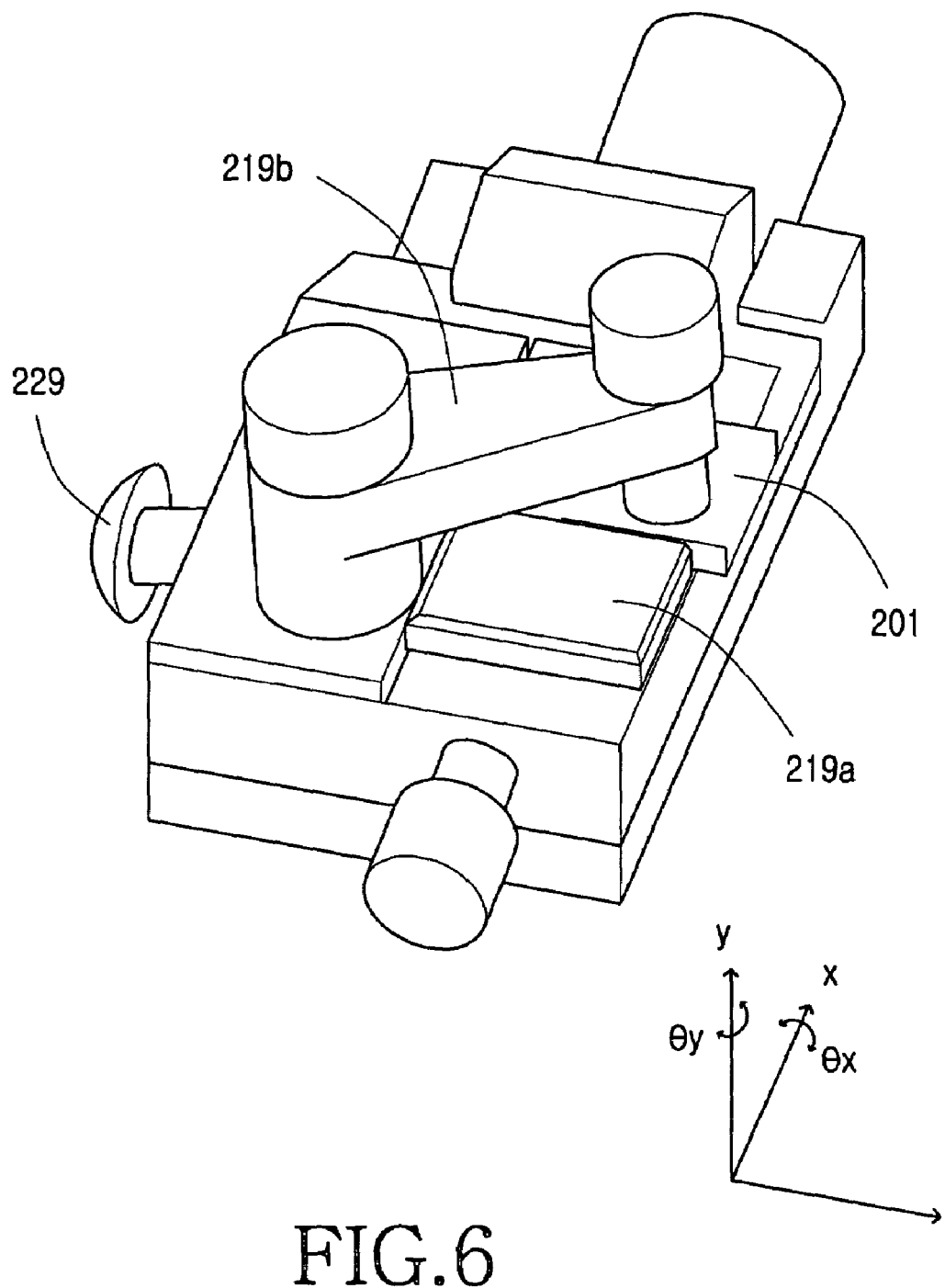
FIG. 6 is a perspective view of a jig of the alignment apparatus for optical fiber blocks shown in FIG. 3.

As shown in FIG. 6, the jig 219 for locking the optical fiber block includes a bracket 219a for positioning the optical fiber block 201 and a holder 219b for locking the optical fiber block 201 positioned by the bracket 219a. The jig 219 is mounted in a horizontal plane on the upper plate 215 so that the jig can rotate in a y-axial rotational direction θy. In one embodiment of this invention as shown in FIG. 5, a bearing 231 and a rotation shaft 233 are mounted in the upper plate 215, as shown in FIG. 5. The bearing 231 is press-fitted into the upper plate 215. The rotation shaft 233 is rotatably connected to the bearing 231 extending axially through the upper plate 215. The rotation shaft 233 protrudes above the upper plate 215. The jig 219 is mounted on the protruded end of the rotation shaft 233. This feature eliminates the need for a precision driving motor to align the jig 219 about the y axis. The optical fiber block 201 is preferably locked on the bracket 219a in a state such that the optical fiber block extends beyond the lower and upper plates 213 and 215.

Figure 7:
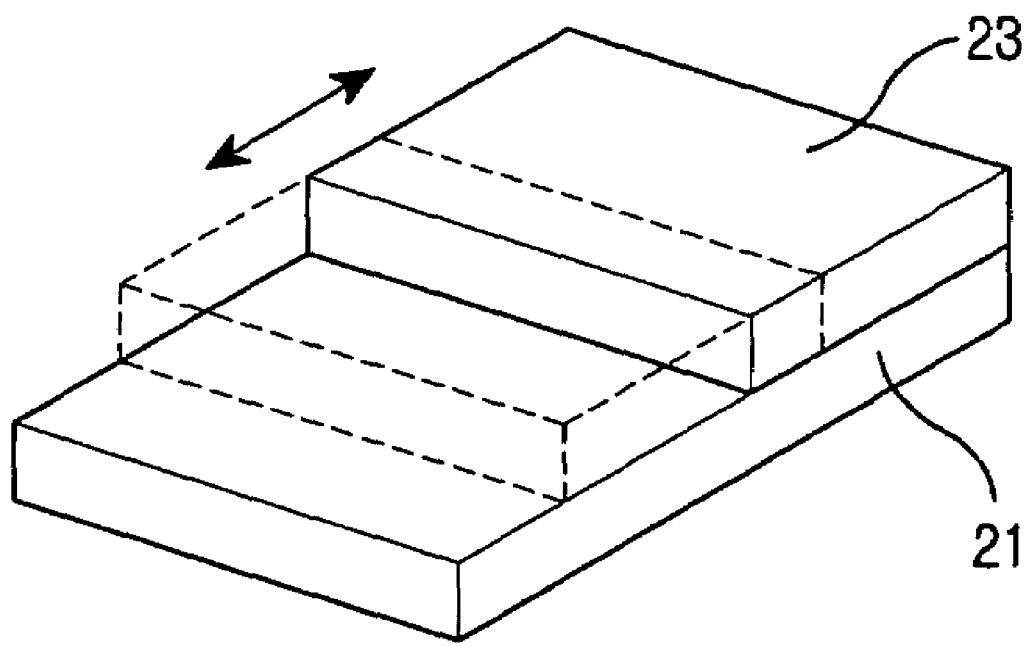
FIG. 7 is a perspective view of a bracket of the jig shown in FIG. 6.

In another embodiment of this invention as shown in FIG. 7, the bracket 219a comprises a locking part 21 and a supporting part 23. The locking part 21 provides a surface upon which the optical fiber block 201 is placed, while the supporting part 23 supports one end of the optical fiber block 201. The size of an optical fiber block 201 varies depending on the number of optical fiber strand arranged on the optical fiber block 201. Consequently, since the size of different optical fiber blocks 201 may vary, the supporting part 23 may shift its horizontal position on the locking part 21 accordingly to accommodate a range of sizes of optical fiber blocks 201. This feature results in using one bracket 219a for a range of optical fiber blocks 201 of different sizes. This eliminates the disadvantage of a conventional alignment apparatus for optical fiber blocks wherein the bracket must be replaced every time an optical fiber block of a different size is to be aligned.

Describing the operation of the components of the alignment apparatus 200 for optical fiber blocks according to the embodiments of this invention, the resilient force applied by the resilient means 221 is applied against the portion of the upper plate 215 extending perpendicular to it. This force results in the linear displacement of the upper plate 215. As the upper plate 215 is fixed to the jig by means of the rotation shaft 233, the jig 219 is also displaced by the same magnitude in the z horizontal direction. The displacement of the upper plate 215 and jig 219 are restricted in all other linear directions due to the fact that the upper plate 215 is rigidly fixed to the sliding table which is constrained to displacement only in the linear z direction. As these components are displaced, the optical fiber block 201 loaded in the jig comes into close contact with the corresponding counterpart component, such as the planar optical wave-guide element. An end surface of the optical fiber block 101 is aligned parallel to an end surface of the counterpart component. There, the sliding table 217 is at maximum displacement. As the optical fiber block 201 comes into close contact with the counterpart component, the jig 219 pivots about the rotation shaft 233 aligning itself automatically. The optical fiber block 201 is aligned in the optimal position when the sliding table 217 is displaced to its maximum extent. Thereafter, the displacement sensor 223 senses this maximum displacement generating a signal causing the locking driver 225 to drive the locking axle 227 to lock the upper plate 215 in its current position. Consequently, the jig 219 is also prevented from further linear displacement thus preventing any further rotation about the rotation shaft 233.

In another embodiment of this invention, the jig 219 may be provided with a spherical member 229 positioned so that it comes into contact with the locking axle 227 when the locking driver 225 drives the locking axle 227 forward to lock the jig 219 in the optimum position. This spherical member 229 is to uniformly distribute a locking force upon the jig 219 when one end of the locking axle 227 comes into contact with it. In one embodiment of this invention and as shown in FIG. 5, two vertical pegs 240 extending vertically upwards in a y direction formed on the top surface of the top plate form the rotational limits that the jig 219 may rotate about the y axis. These pegs limit the rotation and act as stops for the jig 219 when the spherical member 229 come into contact with them. This assures that the spherical member 229 does not rotate outside the range where the locking axle 227 may come into contact with it when it is driven by the locking driver 225.

The alignment apparatus 200 for optical fiber blocks as described in the invention is mounted on the alignment driving actuator 290 that enables the jig 219 to pivot about a y rotational axis θy, so that the alignment apparatus does not require a separate driving motor for alignment in the y rotational axis θy, unlike the conventional alignment apparatus.

The alignment driving actuator 290 requires three dimensional linear and rotational alignments in relation with a x-axis, a y-axis and a z-axis, respectively, where the linear alignments are performed along to the respective x-, y- and z-axes, i.e. in a left or right direction x, in an upward or downward direction y, and in a forward or backward direction z; whereas the rotational alignments are performed about the respective x-, y- and z-axes, i.e. about a x rotational axis θx, about a y rotational axis θy, and about a z rotational axis θz. The linear alignments in all the x-, y- and z-axes and the rotational alignment about the z rotational axis are performed by a lower driving actuator 291, and the rotational alignments to the x-axis is performed by an upper driving actuator 299.

To align the optical fiber block using the alignment apparatus 200, the lower driving actuator 291 performs an approximate alignment first and then the upper driving actuator 299 performs a fine alignment. The alignment about the y rotational axis θy is automatically performed at the moment when the optical fiber block 201 contacts the counterpart component and the jig 219 rotates about the rotation shaft 233.

Figure 1:
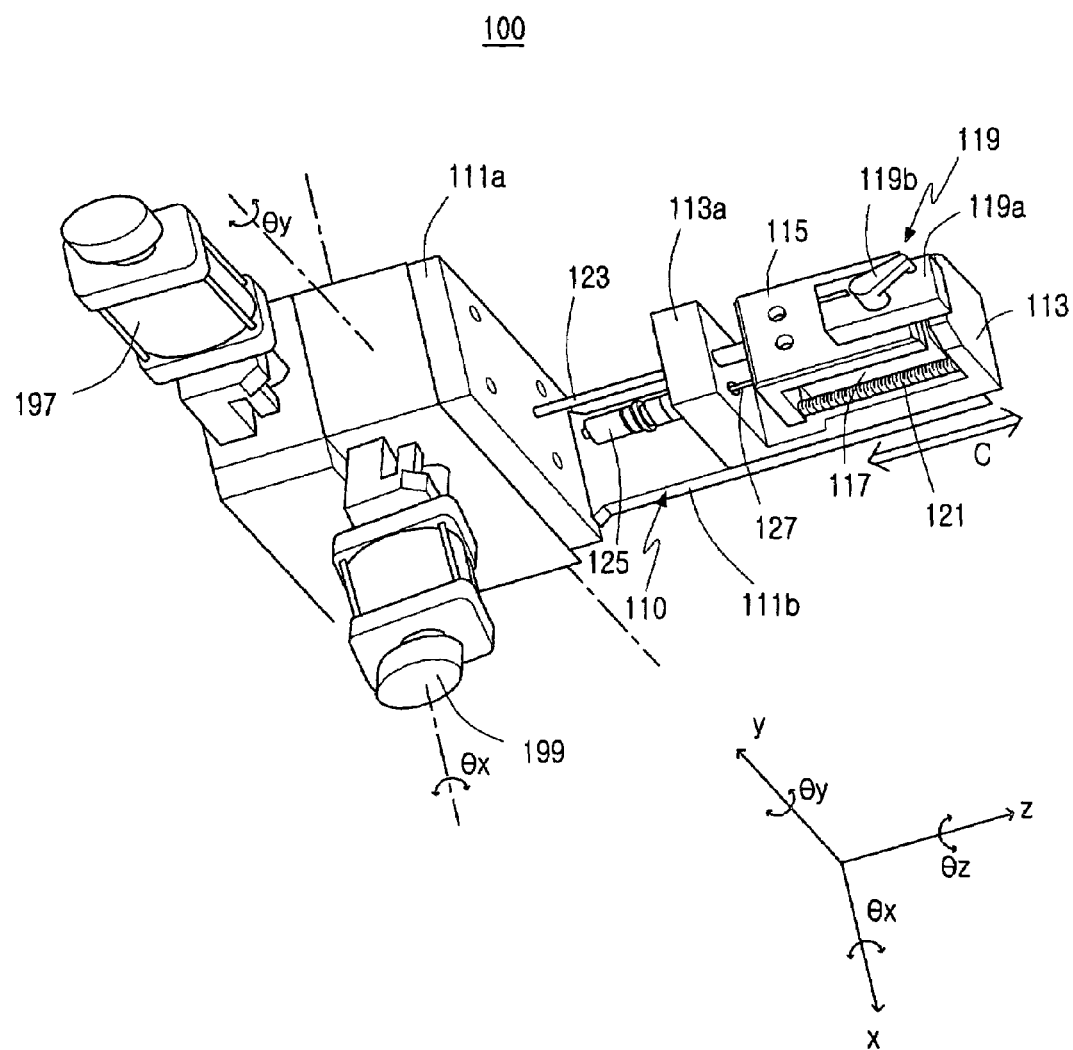
FIG. 1 is a perspective view of an alignment apparatus for optical fiber blocks according to a conventional embodiment.
Figure 2:
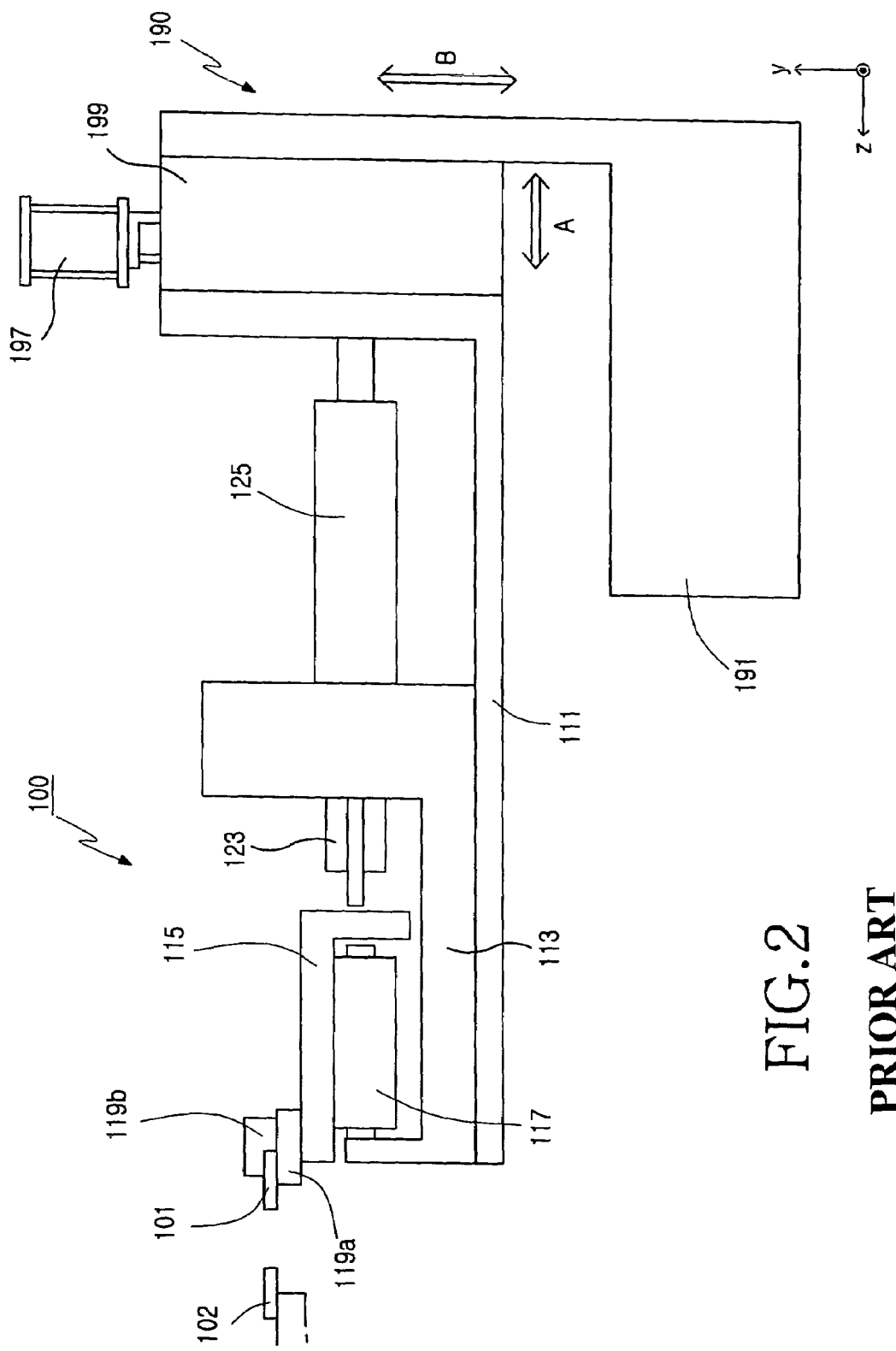
FIG. 2 is a side view for describing operation of the alignment apparatus for optical fiber blocks shown in FIG. 1.

Opposingly, in the conventional alignment apparatus for optical fiber blocks 100, the y axis of rotation θy is located on the rear side of the base plate 111 (see FIG. 1) and is spaced apart from the optical fiber block to a certain extent. Therefore, even a fine operation of the driving motor about the x rotational axis θx results in an increasing displacement of the optical fiber block because of the distance between the y axis of rotation θy and the optical fiber block. The conventional apparatus thus requires the driving motor to be operated with high precision.

To the contrary, the alignment apparatus 200 for optical fiber blocks of this invention provides a y axis of rotation θy located through the position where the optical fiber block 201 is locked. This occurs due to the axis of the rotational shaft 233 that the jig 233 rotates about being located through the c enter of the optical fiber block 201 locked position. Therefore, it is easy to adjust a displacement of the optical fiber block 201 finely during the alignment of the optical fiber block. Moreover, it is possible to simultaneously perform the alignment about the y and x axes of rotation, θy and θx, because as a resilient force is applied in a direction in which the optical fiber block 201 contacts the counterpart component, the rotation shaft 233 and bearing 231 provide a rotational means for the jig.

In the embodiments of the present invention as shown in FIG. 8, the following is a description of the procedure for aligning an optical fiber block using the alignment apparatus 200 for optical fiber blocks. The optical fiber block 201 is positioned on the alignment apparatus 200, wherein the alignment apparatus 200 is mounted on the alignment driving actuator 290. Here, the bracket 219a is adjusted to accommodate the size of the optical fiber block 201. When the optical fiber block 201 is positioned, the lower driving actuator 291 is operated to perform linear alignments initially for the x- and y-axial directions and the rotational alignment about the z rotational axis and then to advance the alignment apparatus 200 toward the counterpart component 202, such as the planar wave-guide element, in the z-axial direction.

When the alignment apparatus 200 advances coming into contact with the optical fiber block 201, the lower driving actuator 291 causes the optical fiber block 201 to advance to a predetermined extent. As the optical fiber block 201 makes contact with the counterpart component, the resulting reaction force of the counterpart component 202 forces the jig 219, upper plate 215, and sliding table 217 in the opposite linear z direction relative to the displacement of the alignment apparatus 200. It will be apparent that advancement of the alignment apparatus 200 by the lower driving actuator 291 should be limited to a displacement no greater than the maximum traveling range of the sliding table 217 on the lower plate 213 once the optical fiber block 201 makes contact with the counterpart component 202. As the sliding table 217, upper plate 215, and jig 219 move in the opposite direction relative to the movement of the alignment apparatus 200, a resilient force from the resilient means 221 acts upon the upper plate 215 and ultimately the jig 219 and the sliding table 217 as well. The reaction of the forces acting between the optical fiber block 201 and the counterpart component 202 causes the jig 219 to rotate about the y rotational axis θy. The jig 219 continues to rotate freely from the point when the optical fiber block 201 comes into contact with the counterpart component 202 until the point when the alignment is completed.

After the alignment apparatus 200 is advanced to a proper position, the alignment about the x rotational axis θx is performed by the upper driving actuator 299. At this point, the jig 219 also continues to rotate freely about the y rotational axis θy. This configuration efficiently provides for the precise and simultaneous alignment about both x and y axes rotational axes, θx and θy, without the need for an independent driving motor for alignment about the y axis of rotation. At such time when the optical fiber block 201 makes contact with the counterpart component, the displacement sensor 223 senses the position where the sliding table 217 is advanced to a maximum displacement. At such time the alignment of the optical fiber block 201 is complete and the locking driver 225 causes the locking axle 227 to be advanced. In one embodiment of this invention the locking axle 227 advances and makes contact with the upper plate 215 preventing any further linear movement of the upper plate 215, sliding table 217, and jig 219. This also restricts the jig 219 from any further rotation about rotational shaft 233. In another embodiment the locking axle 227 advances towards the spherical member 229 provided with the jig 219. Once contact is made the spherical member locks the jig 219 in place preventing it from further advancement or rotation and also preventing further advancement of the upper plate 215 and sliding table 217.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An alignment apparatus for aligning a planar optical wave-guide element and an optical fiber block, comprising:
   a lower plate in a substantially horizontal orientation;
   a sliding table mounted on the lower plate capable of a horizontal displacement on the lower plate;
   an upper plate mounted to the sliding table; and,
   a jig for holding the optical fiber block, disposed on the upper plate and fixed to rotational means capable of rotation about an axis being perpendicular to the displacement of the sliding table so that the jig is capable of rotation about the upper plate.

2. The alignment apparatus according to claim 1, wherein the rotational means comprises a rotation shaft passing through a bearing pressed into the upper plate.

3. The alignment apparatus according to claim 2, further comprising a resilient means for providing a resilient force upon the sliding table in a direction opposed to the force applied to the sliding table when the optical fiber block comes into contact with the planar optical wave-guide element.

4. The alignment apparatus according to claim 3, further comprising a displacement sensor for sensing a traveling distance of the sliding table on the lower plate.

5. The alignment apparatus according to claim 4, further comprising a locking axle movably mounted through the lower plate and capable of moving in a horizontal direction to contact a rear side of the jig in place free from all displacement and rotation.

6. The alignment apparatus according to claim 5, further comprising a locking driver for moving the locking axle.

7. The alignment apparatus according to claim 6, further comprising a spherical member formed on the jig for causing the jig to lock in place free from all displacement and rotation when contacted by the locking axle.

8. The alignment apparatus according to claim 7, further comprising a bracket provided on the jig surface for resting the optical fiber block thereon and a supporting part that traverses on a holding part of the bracket for supporting one side of the optical fiber block held on the holding part of the bracket.

9. A method of aligning a planar optical wave-guide element and an optical fiber block, comprising the step of providing a means for simultaneously aligning them about the x and y rotational axes wherein the step of providing a means for simultaneously aligning a planar optical wave-guide element and an optical fiber block about the x and y rotational axes comprises providing a rotation shaft with a jig fixed thereon so that the jig may freely rotate as a horizontal force is applied to the jig.

10. The method according to claim 9, further comprising the step of providing a means for accommodating optical fiber blocks of different sizes to be used on a single jig.

11. The method according to claim 10, wherein the step of providing a means for accommodating optical fiber blocks of different sizes to be used on a single jig comprises providing a supporting part for the jig that supports one side of the fiber optic block.

12. The method according to claim 11, wherein the supporting part traverses on a locking part of jig bracket so that the jig may accommodate fiber optic blocks of different sizes.

* * * * *